US007127446B1

(12) United States Patent
Menezes et al.

(10) Patent No.: US 7,127,446 B1
(45) Date of Patent: Oct. 24, 2006

(54) FILE SYSTEM BASED TASK QUEUE MANAGEMENT

(75) Inventors: Evandro Menezes, Austin, TX (US);
Harsha Jagasia, Austin, TX (US);
Morrie Altmejd, Austin, TX (US);
David Tobias, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 713 days.

(21) Appl. No.: 10/283,901

(22) Filed: Oct. 30, 2002

(51) Int. Cl.
*G06F 9/44* (2006.01)
*G06F 17/30* (2006.01)
*G06F 12/00* (2006.01)
*G06F 15/16* (2006.01)

(52) U.S. Cl. .......................... 707/1; 707/10; 707/200; 718/102; 709/201

(58) Field of Classification Search ........ 718/100–108; 707/1–206; 709/200–253
See application file for complete search history.

(56) References Cited

U.S. PATENT DOCUMENTS

| 4,805,107 | A  | * | 2/1989 | Kieckhafer et al. ............. 714/4 |
| 5,327,557 | A  | * | 7/1994 | Emmond ....................... 707/3 |
| 6,725,456 | B1 | * | 4/2004 | Bruno et al. ................. 718/102 |
| 6,775,831 | B1 | * | 8/2004 | Carrasco et al. ............. 718/100 |
| 6,862,595 | B1 | * | 3/2005 | Elko et al. ..................... 707/10 |
| 2003/0050954 | A1 | * | 3/2003 | Tayyar et al. ............... 709/102 |

OTHER PUBLICATIONS

Lu, N.P. et al. "Parallelism exploitation in superscalar multiprocessing." IEEE. Jul. 1998.*

* cited by examiner

*Primary Examiner*—Lewis A. Bullock, Jr.
(74) *Attorney, Agent, or Firm*—Zagorin O'Brien Graham LLP

(57) ABSTRACT

A task queue management technique leverages infrastructure provided by file and operating systems to manage task queues substantially without otherwise typical problems regarding management of the size of the queue and/or the state of the queue (e.g., empty or full) while maintaining, regulating and altering the queue and the order of tasks in the queue. Task producer code is configurable to cause one or more executable files corresponding to each of one or more tasks to be stored in a queue directory responsive to receiving the one or more tasks. A file system associates each executable file with a time stamp indicating when the executable file was stored. Task consumer code is configurable to execute the one or more executable files in an order indicated by the time stamps associated with the executable files and to remove each executable file after execution of each executable file.

18 Claims, 3 Drawing Sheets

FILE SYSTEM BASED TASK QUEUE MANAGEMENT

BACKGROUND

1. Field

The present invention relates to information processing and systems therefor, and, more particularly, to task queue management within such information processing systems.

2. Description of the Related Art

Information processing systems commonly execute a variety of tasks. Such systems implement task queue management techniques to control and manage the execution of such tasks. A queue serves as a place to hold pending tasks prior to execution. As tasks are generated for execution, they are held in a queue in a predetermined order until they are serviced by a task execution unit or system. The process of implementing queues typically involves writing queue management software which can avoid conflicts and ensure proper queuing discipline. A degree of coding, testing, debugging is typically required to develop robust queue management software. All prospective states must be handled, including empty, intermediate and full. Different programs must agree on queue state. Accordingly, a new technique for implementing and managing task queues is desirable which minimizes the degree of coding, testing and debugging otherwise normally required to perform the queuing function, and which improves code density, file speed, reliability and efficiency of task queue management.

BRIEF DESCRIPTION

The present invention relates to information processing and systems therefor, and, more particularly, to task queue management within such information processing systems. For example, an information processing system such as a network is described herein which has an ability to generate and/or receive different task requests (e.g., in the form of functional code such as a computer program) and to assign tasks (e.g., scripts for execution to service one or more tasks) for execution by execution units within the information processing system, in an efficient manner by leveraging file infrastructure provided by file and operating systems. (Hereinafter, for the purposes of the present disclosure, the term "file system" shall include any type of file system or software system capable of handling the creation, storage and manipulation of files, one or more of such file systems typically being included with or as part of an operating system for example.) The system embodiments described herein can manage task queues substantially without the usual problems regarding management of the size of the queue and/or the state of the queue (e.g., empty or full). These problems may be handled more efficiently by involving the operating/file system of the information processing system. Also, for example, the file system time stamp can be used to maintain, regulate and alter the queue and the order of tasks in the queue. If non-volatile storage is used for the queue, it would also be safe against power failures.

For example, in one embodiment, an apparatus such as an information processing system includes a task producer and a task consumer. The task producer may be computer code configurable to cause one or more executable files corresponding to each of one or more tasks to be stored in a queue directory responsive to receiving the one or more tasks. A file system associates each executable file with a time stamp indicating when the executable file was stored. The task consumer may be computer code configurable to execute the one or more executable files in an order indicated by the time stamps associated with the executable files and to remove each executable file after execution of each executable file. The apparatus may further comprise the file system and/or the queue directory. The queue directory may be, for example, a shared memory region accessible by both the task producer and task consumer. The task producer and task consumer may be resident on different computer systems within a networked file system.

In another embodiment, a method of managing a task queue is provided including the steps of storing code for performing a first task in a first file with a first time stamp, storing code for performing a second task in a second file with a second time stamp, and accessing the code from one of the first and second files corresponding to a next task to be performed, the next task being determined dependent upon the first and second time stamps. In a further embodiment, the step of accessing includes determining which of the first and second times is earlier. In a further embodiment, the first time stamp includes first temporal information indicative of a first time that the code for performing the first task was stored in the first file, and the second time stamp includes second temporal information indicative of a second time that the code for performing the second task was stored in the second file.

In another embodiment, a method of managing a task queue includes generating software program tasks by a first execution environment. An executable file corresponding to each generated software program task is stored in a queue directory to be accessible by the first execution environment and a second execution environment. A file system associates each executable file with a time stamp indicating when the executable file was stored. The executable files are executed by a second execution environment in an order indicated by the time stamps associated with the executable files. Each executable file is removed after execution of each executable file by the second execution environment.

The foregoing provides a brief description, or summary, of certain embodiments discussed in greater detail in the detailed description below. Consequently, the foregoing contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

Figure 1:
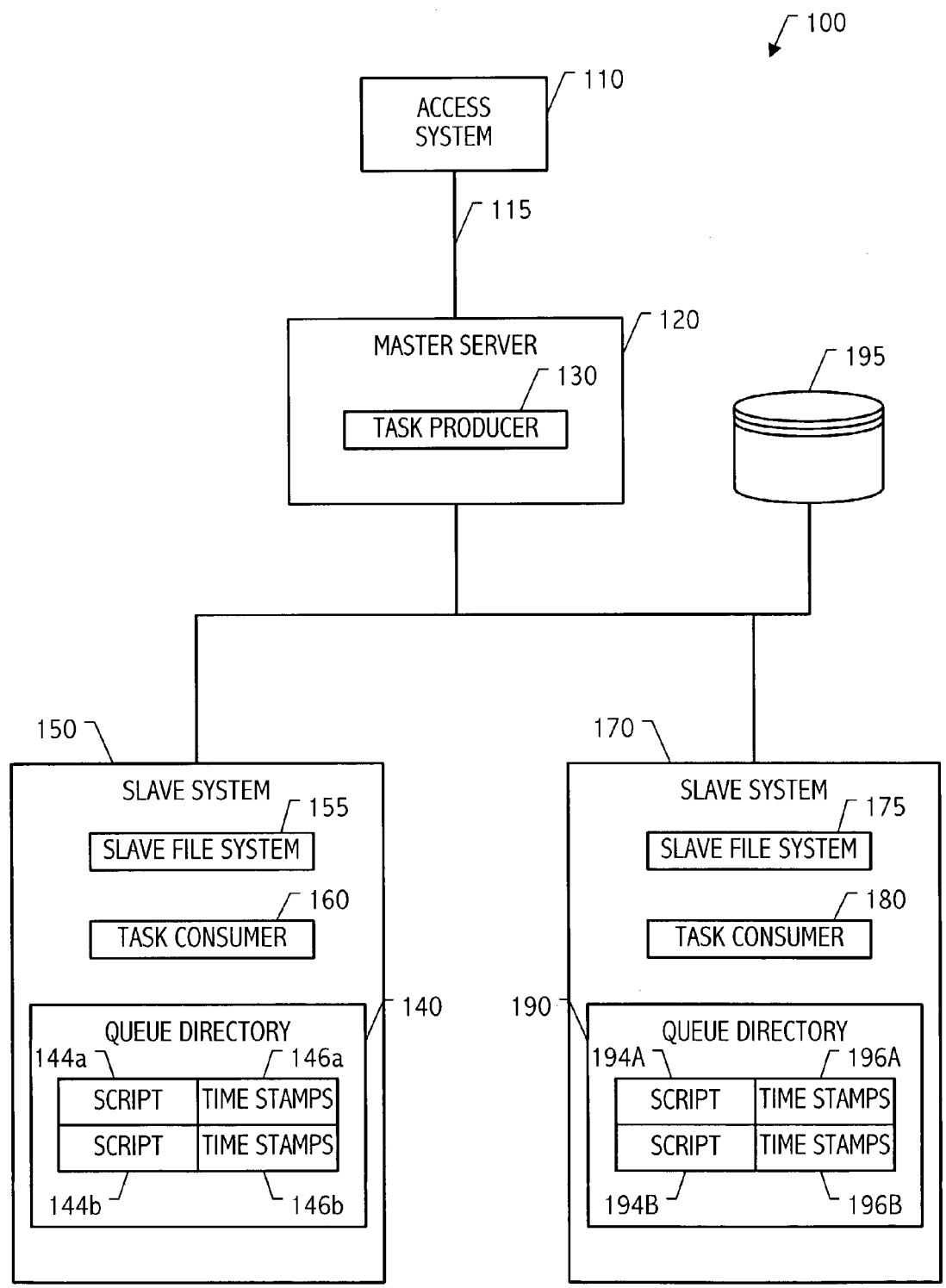
FIG. 1 is a block diagram of one embodiment of an information processing system/network configurable for managing a multiple processing unit/system in accordance with the invention.

FIG. 1 is a block diagram of an information processing system, in this case network 100, for providing an execution environment capable of processing a multitude of information processing tasks. Network 100 includes access system 110, master server 120 and slave systems 150 and 170. Access system is coupled to master server 120 via network coupling 115, and master server 120 is coupled to slave servers 150 and 170 via network coupling 125. Any type of appropriate network coupling and/or network architecture may be used in the illustrated embodiment.

Access system 110 is representative of any access point to network 100. As such, access system 110 may be any appropriate type of information processing system, for example, which allows users to send tasks to be performed by master server 120 or any other system platform of network 100. In one embodiment, access system 110 is a personal computer or workstation which is used by a network user to send tasks for execution within network 100. As such, access system 110 is representative of a variety of access points to network 100, and although only one access system is shown in FIG. 1, it is expected that many such access points will be used.

Master server 120 is representative of any type of information processing system which is configurable to receive task requests (e.g., from access system 110), and for executing such tasks and/or for preparing such tasks for execution by other information processing systems of network 100 such as slave systems 150, 170. Master server 120 includes task producer 130. In the illustrated embodiment, task producer 130 is a computer program resident/executed on master server 120. In operation, task producer 130 receives tasks from access system 110 and/or generates tasks according to other programs. The operation of task producer 130 is described in greater detail herein, especially with reference to FIG. 2 below. For purposes of discussion herein, these tasks are queued and serviced by slave systems 150, 170, as is further described herein.

Slave systems 150, 170 are representative of any type of computer system capable of executing tasks assigned to them by master server 120. Slave system 150 includes slave file system 155, task consumer 160 and queue directory 140. Slave system 170 includes slave file system 175, task consumer 180 and queue directory 190. Slave file systems 155, 175 are representative of any type of file system (including operating systems) which are capable of handling the creation, storage and manipulation of files on the respective system. Task consumers 160, 180 and queue directories 140, 190 facilitate the execution of tasks on their respective servers.

In the illustrated embodiment, task consumers 160, 180 are computer programs resident/executed on slave systems 150, 170, respectively. In operation, each of task consumers 155, 175 receives task script files from master server 120 and executes them accordingly. The operation of task consumer 160 in conjunction with queue directory 140 (and by analogy, task consumer 180 and queue directory 190) is described in greater detail herein, especially with reference to FIG. 3 below.

In the illustrated embodiment, queue directories 140, 190 are representative of shared memory segments which are accessible by both task consumers 160, 180, respectively. Each of queue directories 140, 190 is also accessible by task producer 130. Each of queue directories 140, 190 is managed by the corresponding one of file systems 155, 175. Each queue directory is configured to store task script files with corresponding time stamps. For example, as illustrated, queue directory 140 includes script files 144 and time stamps 146. Script file 144a corresponds to time stamp 146a, and script file 144b corresponds to time stamp 146b. Similarly, queue directory 190 includes script files 194 and time stamps 196. Script file 194a corresponds to time stamp 196a, and script file 194b corresponds to time stamp 196b.

Thus, network 100 is configured to perform tasks in a distributed computing environment. Master server 110 includes task producer 130, and slave systems 150, 170 include task consumers 160, 180, respectively, to process tasks. During operation, access system 110 provides tasks to master server 120 via network coupling 115. In the embodiment shown, task producer 120 and task consumers 160, 180 are software programs operating on master server 120 and slave systems 150, 170, respectively. Task producer 120 receives tasks, and configures them for storage in task queue directory 140. As each task is received at and stored in queue directory 140, each task is stored in a task script file 144 by the file system controlling queue directory 140 (e.g., slave file system 155). The file system 155 records a time stamp 146 for each task script file 144. Each of task consumers 160, 180 may then access queue directory 140, and perform the next task for execution as indicated by the queue.

Figure 2:
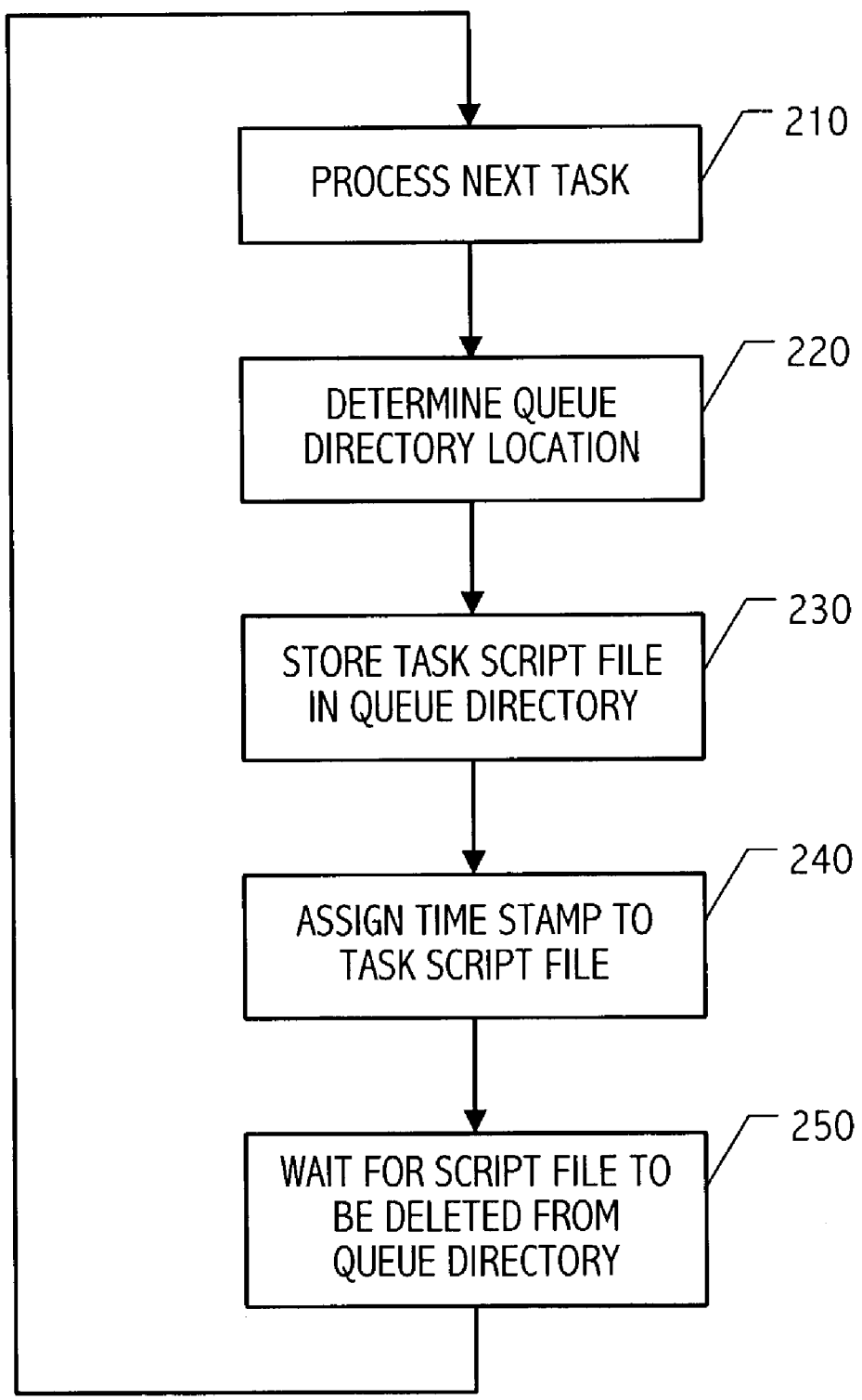
FIG. 2 is a flowchart showing an exemplary operational flow of a producer-side task execution module.

FIG. 2 is a flow diagram illustrating an exemplary operation of one embodiment of a task producer. During process next task operation 210, a next task is processed. For example, a user of network 100 uses access system 110 to issue a task for execution by the network 100. Master server receives the task and provides it to task producer 130. Task producer prepares the task for execution by one or more of slave systems 150, 170. At least one example of task preparation and execution is described in U.S. patent application Ser. No. 10/283,930, entitled "Automatic Assimilation of Parameters into Program Code," naming Evandro Menezes, Harsha Jugasia, Morrie Altmejd and David Tobias as inventors, filed on the same day as the present application (Oct. 30, 2002), and which is incorporated by reference herein in its entirety.

Upon receipt of the task by task producer 130, task producer 130 determines (or may have already determined prior to operation 210) the queue directory location during determine queue directory location operation 220. In the presently discussed example, the location of queue directory 140 is determined. As illustrated, queue directory 140 is resident on slave system 150, and each slave system of network 100 includes its own queue directory. However, queue directory 140 may be located as part of master server 120, in which case the file system of master server 120 handles the tasks that would otherwise be handled by file system 155. Alternatively, queue directory 140 may be stored in a server or storage unit separately from master server 120, such as database 195 shown in FIG. 1.

Referring again to FIG. 2, once the task has been received (operation 210) and the queue directory location is known (operation 220), the task is stored in a script file in the queue directory 140 during store script operation 230. For example, task script file 144a is stored in queue directory 140 by task producer 130. Task producer 130 accesses the file system 155 and instructs it to save the task script file. File system 155 stores the task script file 144a in queue directory 140 during store script operation 230.

File system 155 also stores a time stamp 146a corresponding to the task script file 144a during assign time stamp operation 240. Time stamp 146a includes temporal information corresponding to task script file 144a. For example, time stamp 146a identifies when the task script file 144a was saved. Time stamp 146a may also identify when the task script file 144*a* was created, last accessed, and/or last modified. Time stamp 146*a* may include other temporal information.

After the task script file 144*a* and time stamp 146*a* are saved in queue directory 140 by queue producer 130 (operations 130, 140), task producer 130 then waits for task script file 144*a* to be deleted by task consumer 160, and repeats the process as necessary for additional tasks that are received or generated.

The following pseudo-code is representative of a set of operations of task producer 130:

Start;
   Read configuration file and get queue directory location;
   Again:
   Add script files to the queue;
   Do
     Check if file still exists;
   Until all files added to the queue don't exist anymore;
   Go to Again;
End.

Figure 3:
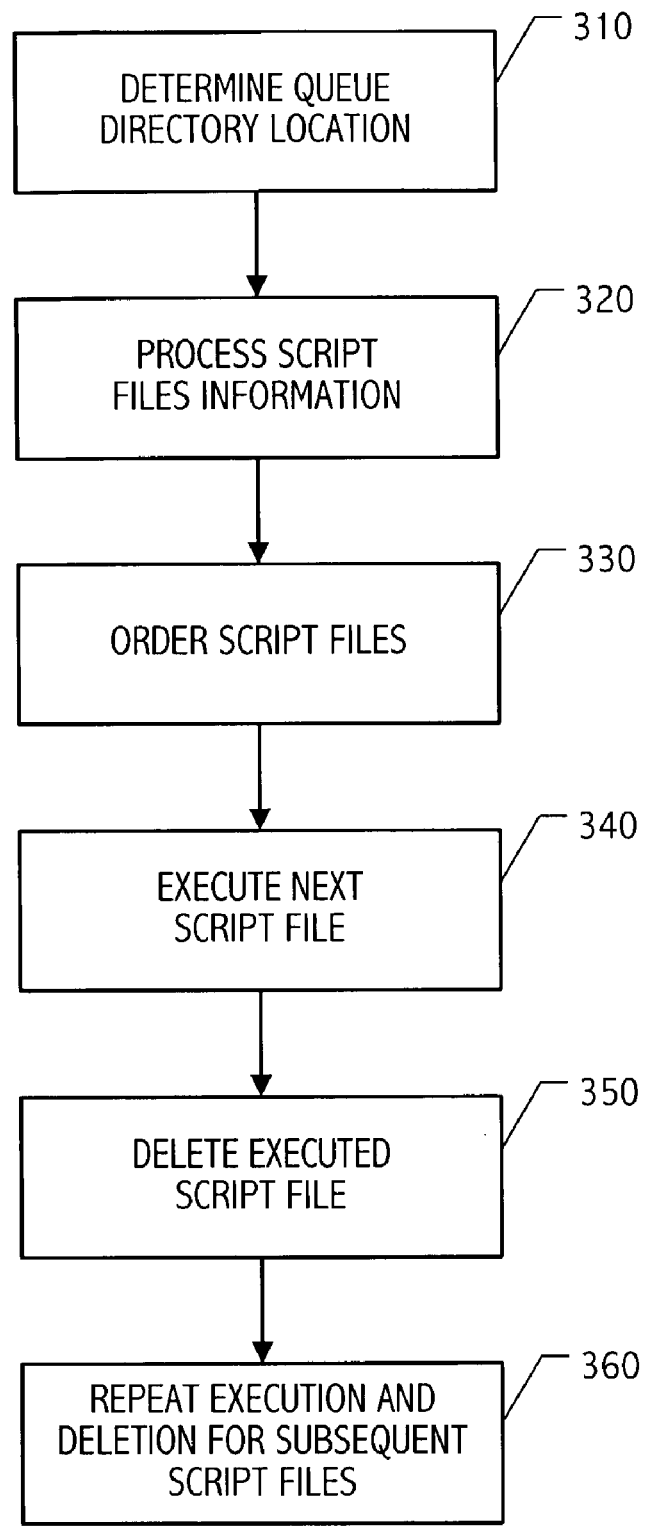
FIG. 3 is a flowchart showing an exemplary operational flow of a consumer-side task execution module.

After the task script file 144*a* and time stamp 146*a* are saved in queue directory 140 by task producer 130 (operations 130, 140), the task script file 144*a* and any other task script files are available for being accessed and executed by task consumer 160 or any other task consumer on slave system 150. FIG. 3 is a flow diagram illustrating an exemplary operation of one embodiment of such a task consumer.

During locate queue operation 310, task consumer 160, for example, determines where queue directory 140 is located. This can be done by task consumer 160 reading a configuration file and obtaining the queue directory location information from the configuration file.

Once task consumer 160 has determined the location of queue directory 140 (operation 310), task information is processed during process script information operation 320. For example, task consumer 160 determines how many tasks are pending in the queue for execution by enumerating each of the script files 144 in the queue directory 140 and evaluating the time stamps 146 associated therewith. The tasks are then ordered by task consumer 160 during order operation 330. For example, task consumer 330 orders the script files 144 according to the time stamps 146 so that the oldest script file may be accessed first.

After the tasks are ordered during order operation 330, a task is executed during execute operation 340. For example, task consumer 160 accesses the oldest script file as indicated by time stamps 146 as the "next script file" and executes the next script file in order to perform the oldest, or first task, in the queue. After the next script file 144 is executed during execute operation 340, the task is removed from the queue. For example, task consumer erases the script file corresponding to the executed task. The process of executing tasks in order by executing and deleting task script files is repeated during repeat operation 360 for the remainder of the enumerated script files. In this fashion, the tasks stored in the queue are executed by the slave system 150 in order.

The following pseudo-code is representative of a set of operations of task consumer 160:

Start;
   Read configuration file and get queue directory location;
   Again:
   Enumerate the script files in the queue;
   Do
     Execute the earliest script;
     Delete it;
   Until through with the script files;
   Go to Again;
End.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

For example, those skilled in the art will recognize that boundaries between the functionality of the above described operations are merely illustrative. The functionality of multiple operations may be combined into a single operation, and/or the functionality of a single operations may be distributed in additional operations. Moreover, alternative embodiments may include multiple instances of a particular operation, and the order of operations may be altered in various other embodiments.

The operations discussed herein may consist of steps carried out by system users, hardware modules and/or software modules. In other embodiments, the operations of FIGS. 2 and 3, for example, are directly or indirectly representative of software modules (e.g., factories, objects, routines, or other partitional software designations) resident on a computer readable medium and/or resident within a computer system and/or transmitted to the computer system as part of a computer program product. Thus, the operations referred to herein may correspond to modules or portions of modules (e.g., software, firmware or hardware modules, or combinations thereof). The functionality of operations referred to herein may correspond to the functionality of modules or portions of modules in various embodiments. Accordingly, the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

The above described method, the operations thereof and modules therefor may be executed on a computer system configured to execute the operations of the method and/or may be executed from computer-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or a file/operating system. A computer program is typically stored internally on computer readable storage media or transmitted to the computer system via a computer readable transmission medium. A computer process typically includes an executing (running) program or portion of a program, current program values and state information, and the resources used by the file/operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The method(s) described above may be embodied in a computer-readable medium for configuring a computer system to execute the method. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; spintronic memories, volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

It is to be understood that the architecture(s) depicted herein (e.g., in FIG. 1) are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claims reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. An apparatus comprising:
  task producer code, when executed, causing one or more executable files corresponding to each of one or more tasks to be stored in a queue directory responsive to receiving the one or more tasks, wherein a file system is configured to provide each of the executable files with a time stamp indicating when an associated one of the executable files was stored; and
  task consumer code, when executed, causing the one or more executable files to execute in an order indicated by the time stamp associated with each of the executable files and to remove each of the executable files after execution, wherein the task producer and task consumer code are tangibly embodied on one or more computer readable storage media.

2. The apparatus of claim 1, wherein the file system is included within the apparatus.

3. The apparatus of claim 1 further comprising:
  a first execution environment, the first execution environment being coupled to access and execute the task producer code; and
  a second execution environment, the second execution environment being coupled to access and execute the task consumer code.

4. The apparatus of claim 3, wherein the queue directory is included within the apparatus.

5. The apparatus of claim 4 wherein the queue directory is accessible by the first and second execution environments.

6. The apparatus of claim 3, wherein the first and second execution environments are first and second computer systems, respectively, coupled via a network, and wherein the queue directory is stored in a memory of the second computer system.

7. The apparatus of claim 1, wherein the apparatus includes at least one computer system.

8. A method of managing a task queue of a computer system, comprising:

storing first code for performing a first task in a first file with a first time stamp in a queue directory of the computer system;

storing second code for performing a second task in a second file with a second time stamp in the queue directory; and accessing one of the first and second code to perform a next task, the next task being determined dependent upon the first and second time stamps, wherein the first and second time stamps indicate when the first and second files, respectively, were stored.

9. The method of claim 8 further comprising:

executing the accessed one of the first and second code.

10. The method of claim 9 further comprising:

removing the file corresponding to the executed code.

11. The method of claim 10 further comprising:

repeating the accessing until all of the first and second code has been accessed.

12. The method of claim 10, further comprising:

executing the accessed code; and accessing next code from another one of the first and second files corresponding to a next task to be performed, the next task being determined dependent upon the first and second time stamps.

13. The method of claim 12 further comprising executing the next code.

14. The method of claim 13, further comprising:

removing the file corresponding to the next code.

15. The method of claim 8, wherein the step of accessing the code includes determining which of the first and second time stamps is earlier in time.

16. The method of claim 8, wherein:

the first time stamp includes first temporal information indicative of a first time that the first code for performing the first task was stored in the first file; and the second time stamp includes second temporal information indicative of a second time that the second code for performing the second task was stored in the second file.

17. The method of claim 8, wherein a first computer system stores the code in the first and second files in a memory, and wherein a second computer system accesses the code in the first and second files in the memory.

18. A method of managing a task queue comprising:

generating software program tasks by a first execution environment;

causing executable files corresponding to the generated software program tasks to be stored in a queue directory which is accessible by the first execution environment and a second execution environment, wherein a file system associates each of the executable files with a time stamp indicating when each of the executable files were stored;

executing the executable files by the second execution environment in an order indicated by the time stamp associated with each of the executable files; and removing each of the executable files after execution.

* * * * *